(12) United States Patent
DeMars et al.

(10) Patent No.: US 7,900,624 B2
(45) Date of Patent: *Mar. 8, 2011

(54) BARBECUE COOKING APPARATUS WITH VENTILATION SYSTEM

(75) Inventors: Robert DeMars, La Quinta, CA (US); Alan Crawford, Burbank, CA (US)

(73) Assignee: Original Ideas, Inc, La Quinta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/072,063

(22) Filed: Feb. 25, 2008

(65) Prior Publication Data

US 2009/0107481 A1    Apr. 30, 2009

Related U.S. Application Data

(63) Continuation of application No. 11/978,003, filed on Oct. 29, 2007.

(51) Int. Cl.
*A47J 37/00* (2006.01)
*A47J 37/07* (2006.01)
*F24B 3/00* (2006.01)

(52) U.S. Cl. ........ 126/25 R; 126/9 B; 126/9 R; 126/242; 126/245

(58) Field of Classification Search .......... 126/9 B, 126/9 R, 19 R, 21 R, 25 A, 25 AA, 25 B, 126/25 C, 25 R, 26, 29, 30, 40, 242, 245, 126/286, 532, 542, 543, 554, 555; *A47J 37/00, A47J 37/07; F23J 1/00; F24B 3/00; F24C 1/16*
See application file for complete search history.

(56) References Cited

U.S. PATENT DOCUMENTS

| 103,736 | A | * | 5/1870 | Gregory | 126/25 R |
|---|---|---|---|---|---|
| 941,041 | A | | 11/1909 | Phillips | |
| 1,399,704 | A | * | 12/1921 | Eida | 126/1 R |
| 1,795,542 | A | | 3/1931 | Currie | |
| 1,997,509 | A | | 4/1935 | Betteridge et al. | |
| 2,641,243 | A | | 6/1953 | Goss | |
| 2,645,993 | A | * | 7/1953 | Voss | 99/480 |
| 2,687,716 | A | | 8/1954 | Wong | |
| 3,047,186 | A | | 7/1962 | Serio | |
| 3,330,266 | A | | 7/1967 | Stephen | |

(Continued)

FOREIGN PATENT DOCUMENTS

DE    10257937 A1 *  6/2004

(Continued)

*Primary Examiner* — Steven B McAllister
*Assistant Examiner* — Daniel E Namay
(74) *Attorney, Agent, or Firm* — Dan M. DeLaRosa

(57) ABSTRACT

A barbecue apparatus is provided, the apparatus comprises: a firebowl having an open topside and a bottomside, the bottomside comprising at least one aperture; a column has a top and a bottom, the top of the column is attached to the bottomside of the firebowl, the column comprises an internal cavity, the aperture of the bottomside of the firebowl leads to the internal cavity of the column, the column has at least one opening for ventilation; a base connected to the bottom of the column; a lid situated atop the open topside of the firebowl, the lid has at least one opening for ventilation, the lid further comprises a device for opening and closing the opening; and at least one ash scraper assembly, the assembly comprises at least one scraper and at least one scraper handle, the scraper comprises an axle rod and at least one arm extending from the axle rod, the scraper handle designed to be connected to the scraper to thereby rotate the arm to allow the arm to cover and uncover the aperture for venting purposes.

18 Claims, 11 Drawing Sheets

U.S. PATENT DOCUMENTS

| | | | | |
|---|---|---|---|---|
| 3,349,948 A | | 10/1967 | Hughes | |
| 3,450,123 A | * | 6/1969 | Tidd | 126/25 R |
| 3,568,590 A | | 3/1971 | Grice | |
| 3,915,145 A | * | 10/1975 | Tomita | 126/25 B |
| 3,959,620 A | * | 5/1976 | Stephen, Jr. | 219/386 |
| 4,281,633 A | * | 8/1981 | Wackerman | 126/25 C |
| 4,285,441 A | | 8/1981 | Ziskind | |
| 4,416,248 A | * | 11/1983 | Schlosser | 126/9 B |
| 4,624,239 A | * | 11/1986 | Yellin | 126/25 R |
| 4,777,927 A | * | 10/1988 | Stephen et al. | 126/25 R |
| 5,036,832 A | * | 8/1991 | Schlosser et al. | 126/243 |
| 5,086,752 A | * | 2/1992 | Hait | 126/9 R |
| 5,168,860 A | * | 12/1992 | Kibourian | 126/25 R |
| 5,213,075 A | * | 5/1993 | Stephen et al. | 126/25 B |
| 5,218,950 A | * | 6/1993 | Hait | 126/9 R |
| 5,425,352 A | * | 6/1995 | Gillam et al. | 126/25 R |
| 5,645,041 A | * | 7/1997 | Yu | 126/25 R |
| 5,687,704 A | * | 11/1997 | Lerch et al. | 126/25 R |
| 5,730,114 A | * | 3/1998 | Fabrikant et al. | 126/25 A |
| 5,809,991 A | * | 9/1998 | Pai | 126/242 |
| 5,875,772 A | * | 3/1999 | Saey | 126/25 R |
| D426,419 S | * | 6/2000 | Kuo | D7/334 |
| 6,119,679 A | * | 9/2000 | Galvin | 126/41 R |
| 6,253,760 B1 | * | 7/2001 | Mashburn et al. | 126/41 R |
| 6,318,356 B1 | * | 11/2001 | Stephen et al. | 126/25 R |
| 6,363,925 B1 | * | 4/2002 | Chavana et al. | 126/25 A |
| 6,598,598 B1 | * | 7/2003 | Bratsikas | 126/25 R |
| 6,606,986 B2 | | 8/2003 | Holland et al. | |
| D479,941 S | * | 9/2003 | Blanchette | D7/339 |
| 6,675,794 B1 | * | 1/2004 | Yang | 126/25 R |
| 6,684,876 B2 | * | 2/2004 | Bossler | 126/25 R |
| 6,827,076 B2 | * | 12/2004 | Crawford et al. | 126/25 R |
| D567,011 S | * | 4/2008 | DeMars | D7/335 |
| 2005/0121020 A1 | * | 6/2005 | McLemore et al. | 126/25 R |
| 2006/0102162 A1 | * | 5/2006 | Chiang | 126/25 R |
| 2009/0025574 A1 | * | 1/2009 | Byrnes et al. | 99/447 |

FOREIGN PATENT DOCUMENTS

| | | |
|---|---|---|
| EP | 186929 A1 * | 7/1986 |
| FR | 2843868 A1 * | 3/2004 |
| GB | 2362563 A * | 11/2001 |

* cited by examiner

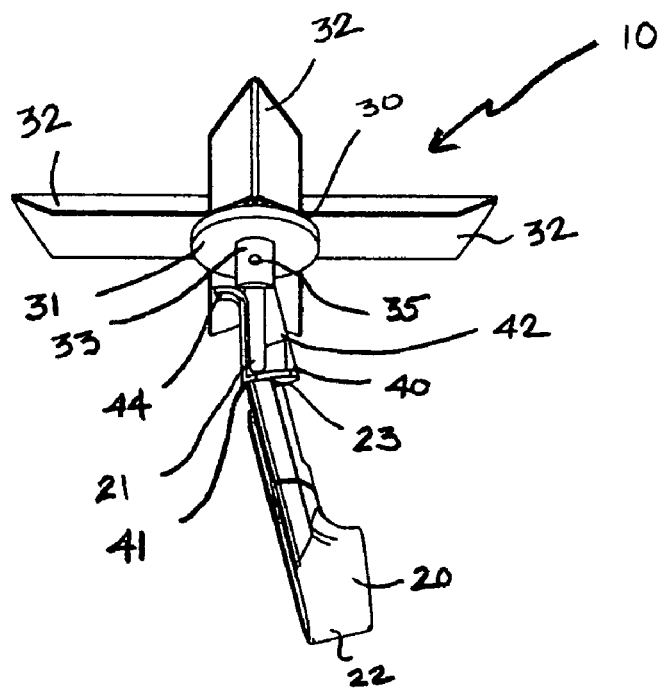
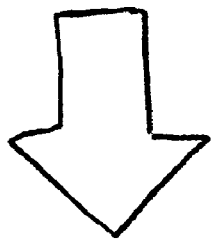
Fig. 6
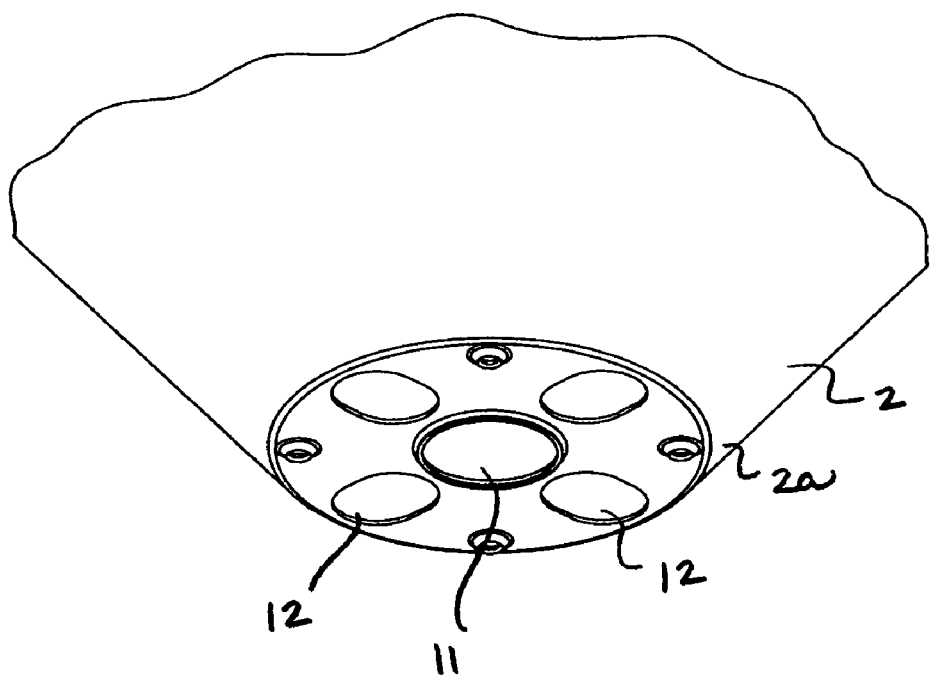

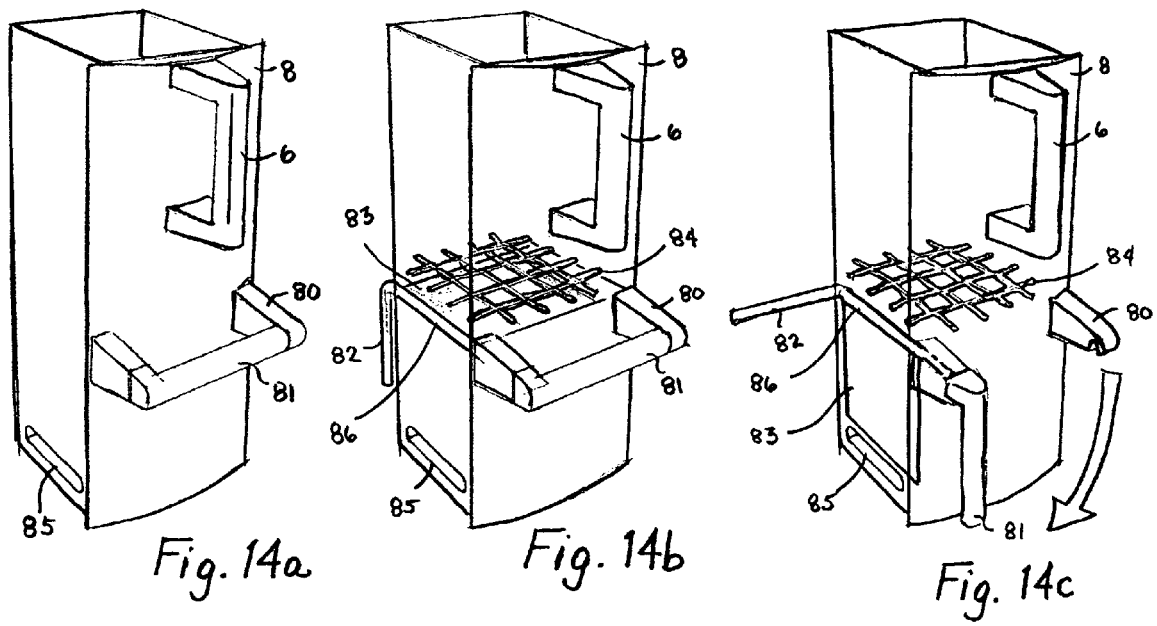

US 7,900,624 B2

BARBECUE COOKING APPARATUS WITH VENTILATION SYSTEM

RELATED APPLICATION

This application is a continuation of U.S. application Ser. No. 11/978,003, entitled "Barbecue Cooking Apparatus with Ash Scraper Assembly" which was filed on Oct. 29, 2007.

BACKGROUND OF THE INVENTION

1. Field of the Invention

The present invention relates to a cooking apparatus with a ventilation device and more specifically, a martini-shaped barbecue comprising a generally funnel shaped firebowl having an open topside and a bottomside, the bottomside comprising at least one aperture; a column has a top and a bottom, the top of the column is attached to the bottomside of the firebowl, the column comprises an internal cavity, the aperture of the bottomside of the firebowl leads to the internal cavity of the column, the column has at least one opening for ventilation; a base connected to the bottom of the column; a lid situated atop the open topside of the firebowl, the lid has at least one opening for ventilation, the lid further comprises a device for opening and closing the opening; and at least one ash scraper assembly, the assembly comprises at least one scraper and at least one scraper handle, the scraper comprises an axle rod and at least one arm extending from the axle rod, the scraper handle designed to be connected to the scraper to thereby rotate the arm to allow the arm to cover and uncover the aperture for venting purposes.

2. Description of the Related Art

It is known in the art to provide cooking appliances and barbecues that have vent systems and have various ways of cleaning ashes from the bottom of the firebowl. Traditional barbecue grills have been designed for burning charcoal as a heat source and have a place for supporting the charcoal below the cooking surface. Both the bowl and the cover have vent openings to provide necessary oxygen for combustion of charcoal while the cover is closed. The vent openings on the bowl have traditionally been used for disposing of ashes that accumulates at the bottom of the chamber. There are numerous ash catcher assemblies and pans used on portable barbecues to clean and remove ashes from the firebowl and collect the ashes in a bin.

The present invention for an ash scraping and collection system which overcomes and addresses the problems of the prior art and also provide for a unique ventilation system. The martini shape of the present invention provides for functionality and esthetics and tremendous innovations in design features. The present invention also provides for a device that dually functions as ash scraper and a vent cover.

SUMMARY OF THE INVENTION

In one embodiment, the present invention provides for a barbecue cooking apparatus which comprises: a martini-shaped barbecue comprising a generally funnel shaped firebowl having an open topside and one central aperture situated adjacent to at least one peripheral aperture at its bottomside; a column comprising a top end, a bottom end, a central cavity and an ash bin, and the peripheral aperture of the firebowl leads to the central cavity of the column, the top end of the column is connected to the bottomside of the firebowl; and an ash scraper assembly comprising a scraper having at least one arm designed to cover and uncover the peripheral aperture and a scraper handle pivotally attached to the scraper and designed to rotate the arms to cover and uncover the peripheral apertures and scrape the bottomside of the firebowl.

In another embodiment, the scraper comprises an axle rod designed to fit within the central aperture. In yet another embodiment, the axle rod has a bottom end, and the scraper further comprises at least one torque ear, and the torque ear comprises at least one pivot hole and at least one slot.

In still another embodiment, the assembly comprises at least one scraper handle and at least one clip mounted slidably on the scraper handle. In still yet another embodiment, the scraper handle comprises a knob and a shaft on opposing ends of the scraper handle, and the shaft has at least one pivot pin designed to be aligned with the pivot hole of the torque ear and allows the scraper handle to be pivotally connected to the scraper. In a further embodiment, the shaft of the scraper handle is designed to fit the slot of the torque ear and the knob leads to a stop. The stop is used to limit the movement of the clip. In still a further embodiment, the clip comprising at least one wedge attached to at least one spring arm, and the spring arm leading to a protrusion which aids in manual movement and has a detent that keeps the clip stationary. In yet a further embodiment, the shaft of the scraper handle is designed to fit and work with the clip, and the clip is designed to lock the ash scraper onto the firebowl and allow the scraper handle to be locked in a generally horizontal position.

In still yet a further embodiment, the bottomside of the firebowl has a lip situated on the periphery of the central aperture, and the wedge of the clip is designed to contact the lip of the central aperture to secure the ash scraper in a latched position. In another further embodiment, the clip is moved downwardly to disengage the ash scraper during the unlatched position. In a further embodiment, the clip can be moved toward the knob end of the handle so that the ash scraper may be disengaged from the bowl.

In another embodiment, the column further comprises a door for access to the central cavity and the removable ash bin of the column. In still another embodiment, the column further comprises a handle, and the handle is connected to the actuator of the ash scraper, and the handle is moveable on a horizontal plane to thereby allow for the opening and closing of the peripheral apertures. In a further embodiment, the column comprises a horizontal opening adjacent to the handle and the scraper handle fits within the opening with the knob of the scraper handle protruding from the opening and allowing the user access to the scraper handle. In another embodiment, the column has a cavity and the removable ash bin fits within the cavity.

In yet another embodiment, the apparatus further comprises a removable lid designed to cover the open topside of the firebowl, and the lid comprises at least one aperture and a pivotally attached rotating handle, and the handle is designed to open and close the aperture for venting purposes.

In still yet another embodiment, the apparatus further comprises a base connected to the bottom end of the column and at least one grill situated within the firebowl.

In another further embodiment, the present invention provides for a barbecue cooking apparatus comprising: a firebowl having an open topside and a bottomside which has a circumference smaller than a circumference of the topside of the firebowl, and the bottomside of the firebowl comprising at least one central aperture situated adjacent at least one peripheral aperture; a base frame comprising a top end, a bottom end, and a central cavity, and the peripheral aperture of the firebowl leads to the central cavity of the column, and the top end of the column is connected to the bottomside of the firebowl; and an ash scraper assembly comprising an ash scraper having at least one arm designed to cover and uncover the peripheral aperture and a scraper handle pivotally attached to the ash scraper and designed to rotate the arm to cover and uncover the peripheral apertures and scrape the bottomside of the firebowl.

In a further embodiment, the ash scraper comprises an axle rod designed to fit within the central aperture, and the axle rod has a bottom end, and the ash scraper further comprises at least one torque ear, and the torque ear comprises at least one pivot hole and at least one slot.

In another embodiment, the assembly comprises at least one scraper handle and at least one clip, and the scraper handle comprises a knob and a shaft on opposing ends of the scraper handle, and the shaft has at least one pivot pin designed to be aligned with the pivot hole of the torque ear and allows the scraper handle to be pivotally connected to the ash scraper, and the shaft of the scraper handle is designed to fit the slot of the torque ear and the knob leads to a stop.

In still another embodiment, the clip comprising at least one wedge attached to at least one spring arm, and the spring arm leading to a protrusion and having a detent, and the shaft of the scraper handle is designed to fit and work with the clip, and the clip is designed to lock and unlock movement of the ash scraper, and the bottomside of the firebowl has a lip situated on the periphery of the central aperture, and the wedge of the clip is designed to contact the lip of the central aperture to secure the ash scraper in a latched position.

In yet another embodiment, the apparatus further comprises at least one grill situated within the firebowl; an ash bin situated on the bottom end of the base frame; and a handle situated on an external surface of the base frame, and the handle is connected to the scraper handle of the ash scraper, and the handle is moveable on a horizontal plane to thereby allow for the opening and closing of the peripheral apertures and scraping of the ashes.

In yet another further embodiment, the present invention provides for a barbecue cooking apparatus comprising: a firebowl having an open topside and a bottomside which has a circumference smaller than a circumference of the topside, and the bottomside of the firebowl comprises at least one central aperture situated adjacent a plurality of peripheral apertures; a base frame comprising a top end, a bottom end, an external surface, an ash collection area and a central cavity, and the peripheral apertures of the firebowl leads to the central cavity of the column, and the top end of the column is connected to the bottomside of the firebowl; an ash scraper assembly comprising an ash scraper having a plurality of arms designed to cover and uncover the peripheral apertures and a scraper handle pivotally attached to the scraper and designed to rotate the arms to cover and uncover the peripheral apertures and scrape the bottomside of the firebowl; and a handle situated on an external surface of the base frame, and a horizontal opening situated adjacent to the handle and the scraper handle protruding from the horizontal opening to allow user access to the ash scraper assembly to thereby allow for the cleaning of the firebowl and the opening and closing of the peripheral apertures for venting purposes.

In a further embodiment, the present invention provides for a barbecue cooking apparatus with ash scraper assembly, the apparatus and assembly comprises: a firebowl having an open topside and a bottomside, the bottomside of the firebowl comprises at least one central aperture situated adjacent at least one peripheral aperture; and an ash scraper assembly comprising at least one scraper and at least one scraper handle, the scraper comprises an axle rod and at least one arm extending from the axle rod, the axle rod designed to fit within the central aperture of the firebowl, and the scraper handle designed to be connected to the scraper to thereby rotate the arm to scrape the bottomside of the firebowl and allow ashes to fall through the peripheral aperture, and to allow the arm to cover and uncover the peripheral aperture for venting purposes.

In still a further embodiment, the axle rod comprises a bottomside and torque ears extending from the bottomside of the axle rod, the torque ears comprise at least one pivot hole and at least one slot.

In yet a further embodiment, the scraper handle comprises at least one shaft with opposing ends, the shaft comprises a knob on one end and a pivot pin on the opposing end, the pivot pin designed to fit within the pivot hole of the torque ears of the axle rod.

In still yet a further embodiment, the ash scraper assembly further comprises at least one clip, and the clip is slidably moveable on the scraper handle and the clip is designed to lock the ash scraper assembly to the firebowl during a latched position.

In another further embodiment, the clip comprises a wedge connected to at least one spring arm, the spring arm of the clip leads to a protrusion and has at least one detent, the clip being slideably moveable on the shaft of the scraper handle.

In another embodiment, the lid comprises a lid handle. In a further embodiment, the base comprises a base handle.

In still another embodiment, one end of the shaft of the scraper handle adjacent to the pivot pin is designed to fit the slot of the torque ear and the knob leads to a stop, and the stop is connected to opposing end of the shaft.

In yet another embodiment, the scraper handle and the axle rod are designed to fit through the central aperture of the bottomside of the firebowl, and the clip locks the scraper assembly to the central aperture of the firebowl and locks the scraper handle into a generally horizontal position in the latched position.

In still another embodiment, the wedge of the clip, in the latched position, is in close proximity to the central aperture and prevents movement of the scraper assembly except a rotary movement about a vertical axis about the central aperture and the wedge constrains the movement of the scraper handle in a generally horizontal plane, and the detent of the spring arm holds the clip in its latched position, and the protrusion of the spring arm aids manual movement by a user of the clip between the latched position and an unlatched position.

In still yet another embodiment, the bottomside of the firebowl has a lip situated on the periphery of the central aperture, and the wedge of the clip designed to contact the lip of the central aperture to secure the ash scraper in the latched position. In a further embodiment, the scraper handle is moved downwardly to disengage the clip during the unlatched position.

In still a further embodiment, the apparatus further comprises a base frame comprising a top end, a bottom end, and a central cavity, and the top end of the base frame is connected to the firebowl, and the central aperture and peripheral aperture of the firebowl leads to the central cavity of the base frame.

In yet a further embodiment, the base frame further comprises an ash bin for collecting ashes scraped by the ash scraper assembly. In still yet a further embodiment, the base frame further comprises an elongated column, the column further comprises a door for accessing the central cavity and a handle for opening the door.

In another further embodiment, the apparatus further comprising at least one grill situated within the firebowl and a removable lid designed to cover the open topside of the firebowl, and the lid comprises at least one aperture and a pivotally attached rotating handle, the handle designed to open and close the aperture of the lid for venting purposes.

In still another further embodiment, the base frame comprises a horizontal opening, and the scraper handle protrudes from the opening and allows the user access to the ash scraper assembly and during a scraping stage, the user guides the scraper handle along the horizontal opening using a horizontal movement.

In yet another further embodiment, the present invention provides for a ash scraper assembly for use with barbecue cooking devices, and the assembly comprises: at least one scraper comprising an axle rod and at least one arm extending from the axle rod, the axle rod designed to work with a barbecue cooking device having a firebowl with a central aperture and at least one peripheral aperture on its bottomside, the axle rod designed to fit within the central aperture of the firebowl of the cooking device, at least one scraper handle designed to be connected to the scraper to thereby rotate the arm to scrape the bottomside of the firebowl of the cooking device and allow ashes to fall through the peripheral aperture of the firebowl, and to allow the arm to cover and uncover the peripheral aperture of the firebowl for venting purposes; and at least one clip, the clip is slidably moveable on the scraper handle and the clip is designed to lock the ash scraper assembly to the firebowl during a latched position.

In still yet another further embodiment, the present invention relates to a barbecue cooking apparatus comprises: a firebowl having an open topside and a bottomside which has a circumference smaller than a circumference of the topside of the firebowl, the bottomside of the firebowl comprising at least one central aperture situated adjacent at least one peripheral aperture; a base frame comprising a top end, a bottom end, and a central cavity, the peripheral aperture of the firebowl leading to the central cavity of the column, the top end of the column being connected to the bottomside of the firebowl; and an ash scraper assembly comprising at least one scraper and at least one scraper handle, the scraper comprises an axle rod and at least one arm extending from the axle rod, the axle rod designed to fit within the central aperture of the firebowl, the scraper handle designed to be connected to the scraper to thereby rotate the arm to scrape the bottomside of the firebowl and allow ashes to fall through the peripheral aperture, and to allow the arm to cover and uncover the peripheral aperture for venting purposes.

In a further embodiment, the present invention provides for a barbecue cooking apparatus with ventilation device, the apparatus and device comprising: a firebowl having an open topside and a bottomside, the bottomside comprising at least one aperture; a base attached to the bottomside of the firebowl, the base comprises an internal cavity, the aperture of the bottomside of the firebowl leading to the internal cavity of the base, the base having at least one opening for ventilation; and a lid situated atop the open topside of the firebowl, the lid has at least one opening for ventilation, and the lid further comprising a device for opening and closing the opening.

In yet another embodiment, the present invention relates to a barbecue cooking apparatus with ventilation device, the apparatus and device comprising: a firebowl having an open topside and a bottomside, the bottomside comprising at least one aperture; a column having top and bottom portions, the top portion of the column is attached to the bottomside of the firebowl, the column comprises an internal cavity, the aperture of the bottomside of the firebowl leading to the internal cavity of the column, the column has at least one opening for ventilation; a base connected to the bottom of the column; and a lid situated atop the open topside of the firebowl, the lid has at least one opening for ventilation, the lid further comprising a device for opening and closing the opening.

In still another further embodiment, the present invention relates to a barbecue cooking apparatus with ventilation device, the apparatus and device comprising: a firebowl having an open topside and a bottomside, the bottomside comprising at least one aperture; a column having a top and a bottom, the top of the column is attached to the bottomside of the firebowl, the column comprises an internal cavity, the aperture of the bottomside of the firebowl leading to the internal cavity of the column, the column having at least one opening for ventilation; a base connected to the bottom of the column; a lid situated atop the open topside of the firebowl, the lid has at least one opening for ventilation, the lid further comprising a device for opening and closing the opening; and at least one ash scraper assembly, the assembly comprising at least one scraper and at least one scraper handle, the scraper comprises an axle rod and at least one arm extending from the axle rod, the scraper handle designed to be connected to the scraper to thereby rotate the arm to allow the arm to cover and uncover the aperture for venting purposes.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 6 is a perspective view of the ash scraper in an assembled form and how it relates with the bottomside of the firebowl of the present invention;

FIGS. 14a-c are perspective views of one of the embodiments of the ash bin of the present invention including see-thru views of the internals of the ash bin.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 1:
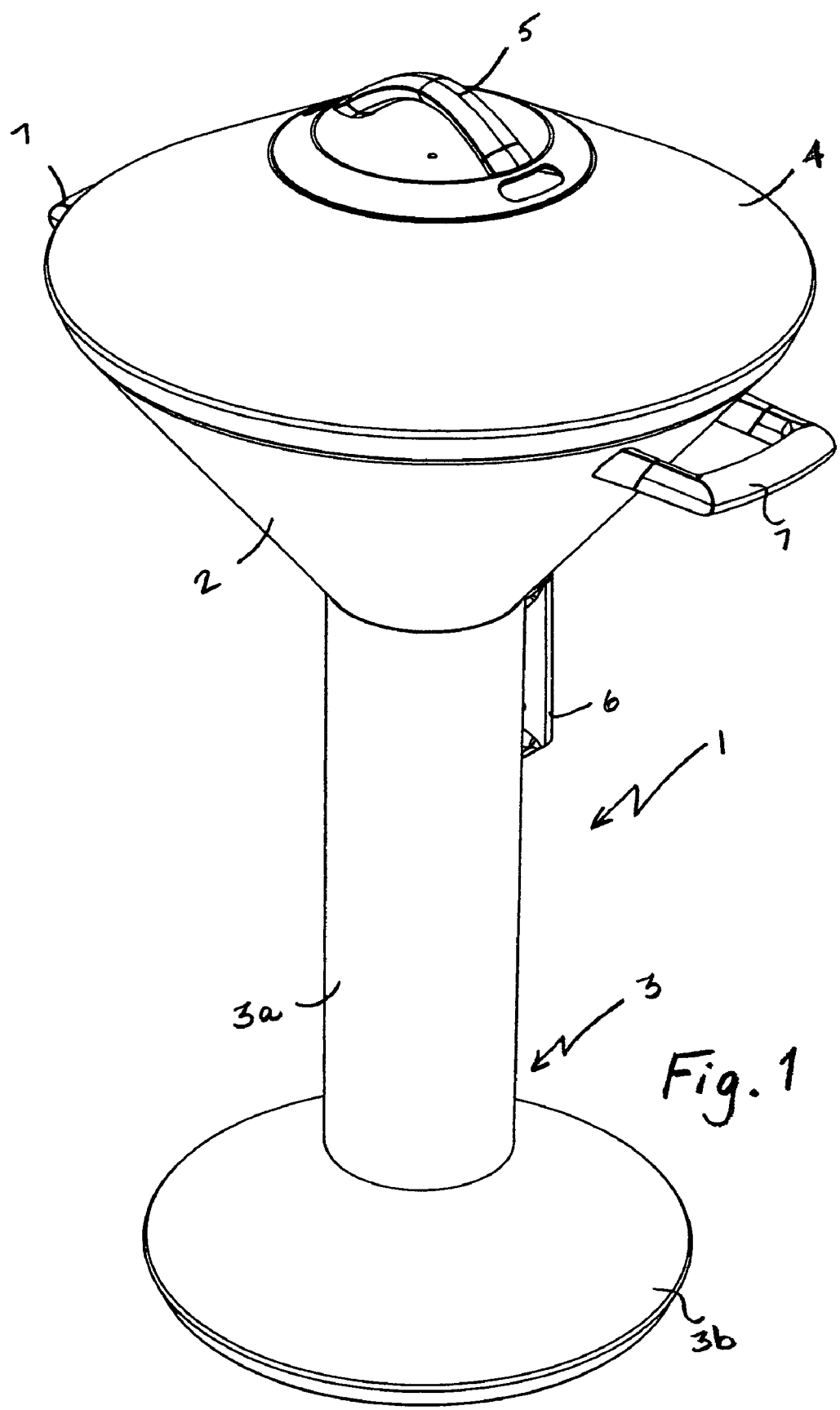
FIG. 1 is a front perspective view of the martini-shaped barbecue in accordance with the present invention.
Figure 2:
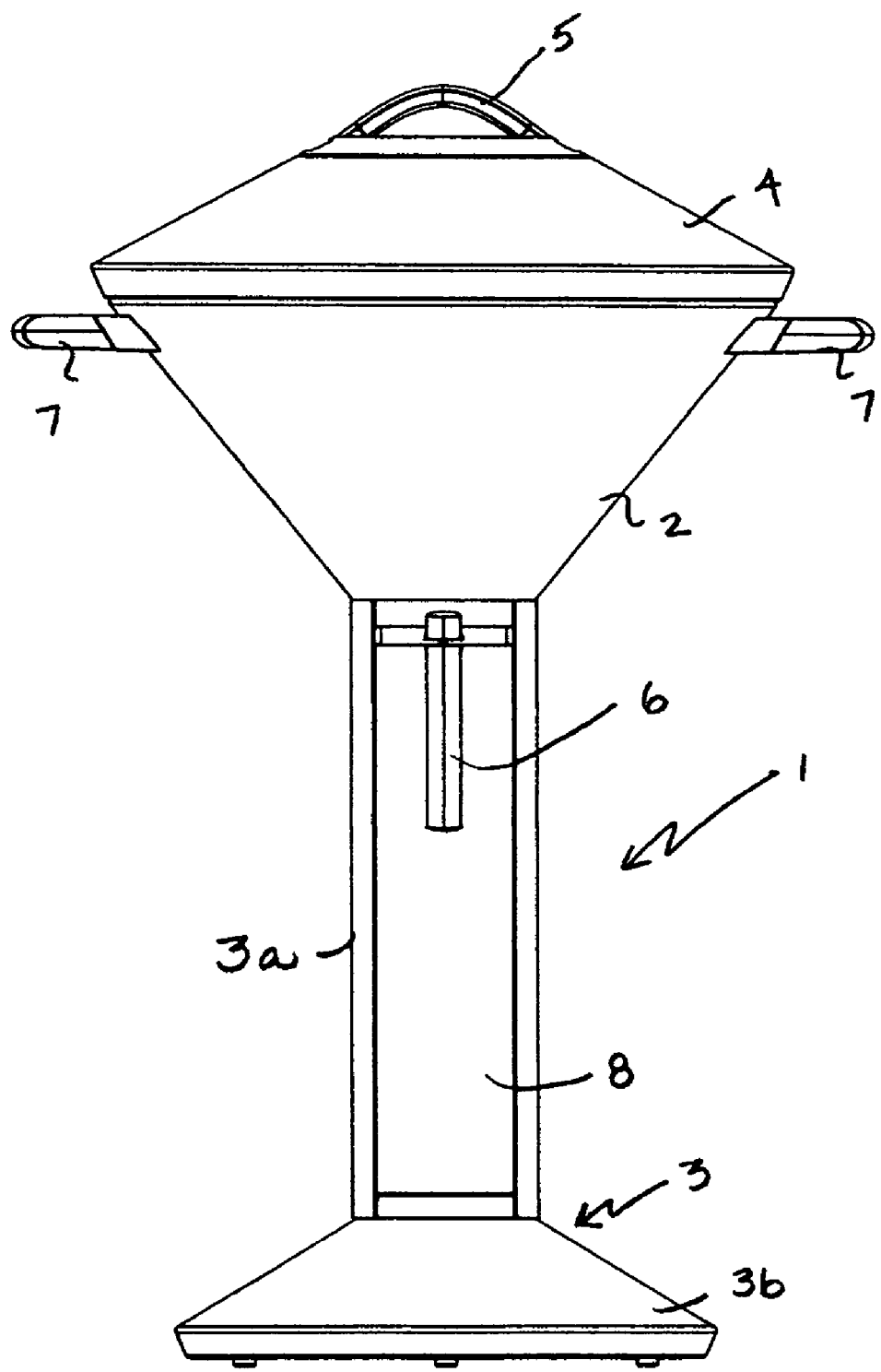
FIG. 2 is a front side view of the barbecue of FIG. 1.
Figure 3:
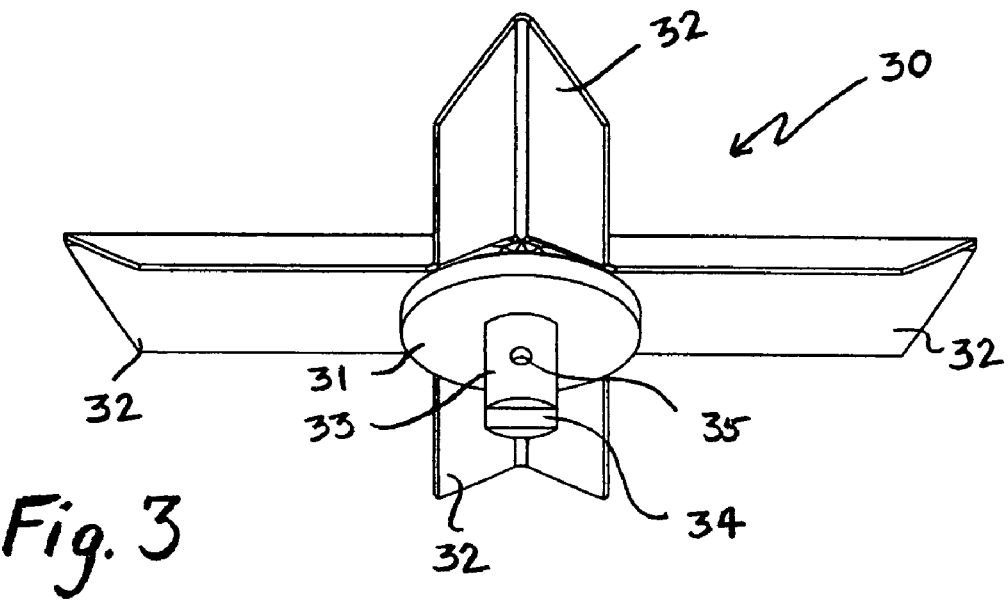
FIG. 3 is a perspective view of the vent cover/ash scraper of the present invention.
Figure 4:
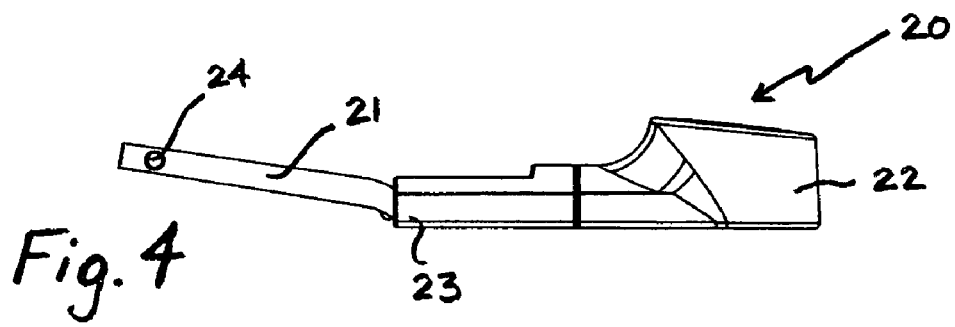
FIG. 4 is a perspective view of the scraper handle of the ash scraper of the present invention.
Figure 5:
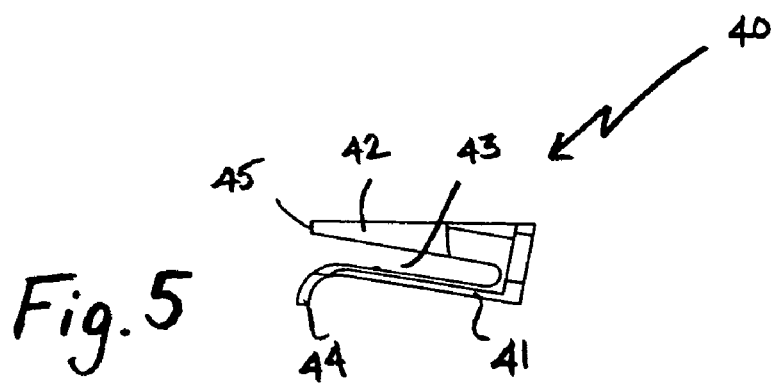
FIG. 5 is a perspective view of the clip of the ash scraper of the present invention.

Referring now to FIGS. 1-2, the martini shaped barbecue cooking apparatus 1 of the present invention comprises a funnel shaped firebowl 2 with a base frame 3 and a lid 4. The base frame 3 comprises an elongated column 3a and a base 3b. The column 3a houses a removable ash bin 8.

FIGS. 3-8 depict the ash scraper/vent cover assembly 10 of the present invention. The assembly 10 comprises: at least one scraper 30 comprising an axle rod 31 and at least one arm or blade 32 extending from the axle rod 31. The axle rod or bearing surface 31 is designed to work with a barbecue cooking apparatus 1 having a firebowl 2 with a central aperture 11 and at least one peripheral aperture 12 on its bottomside 2b. The axle rod 31 designed to fit within the central aperture 11 of the firebowl 2 of the cooking device 1. The assembly 10 further comprises at least one scraper handle or lever 20 designed to be connected to the scraper 30 to thereby rotate the arm 32 to scrape the bottomside 2b of the firebowl 2 of the cooking device 1 and allow ashes to fall through the peripheral aperture 12 of the firebowl 2, and to allow the arm 32 to cover and uncover the peripheral aperture 12 of the firebowl 2 for venting purposes. The assembly 10 further comprises at least one clip or latch 40, and the clip 40 is slidably moveable on the scraper handle 20 and the clip 40 is designed to lock the ash scraper assembly 10 to the firebowl 2 during a latched position.

The axle rod 31 comprises a bottomside and torque ears 33 extending from the bottomside of the axle rod 31, and the torque ears 33 comprises at least one pivot hole 35 and at least one slot 34.

The scraper handle 20 comprises at least one shaft 21 with opposing ends, and the shaft 21 comprises a knob 22 on one end and a pivot pin 24 on the opposing end. The pivot pin 24 designed to fit within the pivot hole 35 of the torque ears 33 of the axle rod 31.

The ash scraper assembly 10 further comprises at least one clip 40, and the clip 40 is slidably moveable on the scraper handle 20 and the clip 40 is designed to lock the ash scraper assembly 10 to the firebowl 2 during a latched position. The clip 40 comprises a wedge 42 connected to at least one spring arm 41, and the spring arm 41 of the clip 40 leads to a protrusion or thumb grip 44 and has at least one detent 43, and the clip is slideably moveable on the shaft 21 of the scraper handle 20. The detent 43 engages with the end of shaft 21 to keep the clip 40 in its latched position. One end of the shaft 21 of the scraper handle 20 adjacent to the pivot pin 24 is designed to fit the slot 34 of the torque ear 33. The free end of the wedge 42 is designed to fit into slot 34, constrained by the torgue ear 33 and the shaft 21. The Stop 23 prevents the clip 40 from moving to the point where the wedge 42 can become disengaged from the slot 34. This maintains the clip's 40 orientation.

Figure 7:
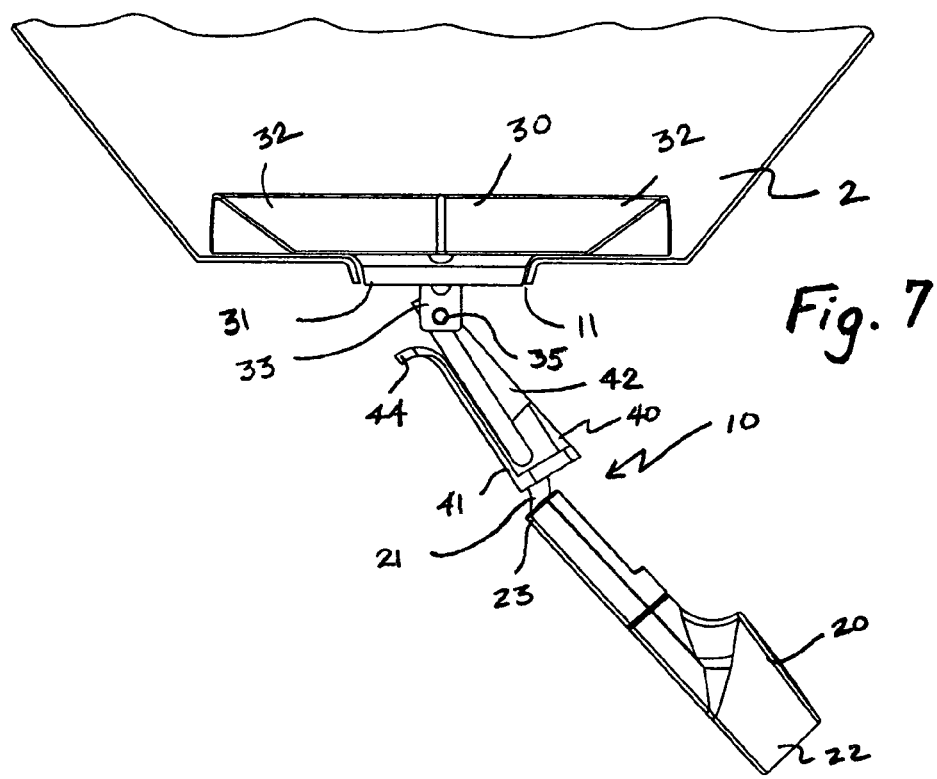
FIG. 7 is a perspective side view of the ash scraper in an unlatched position.
Figure 8:
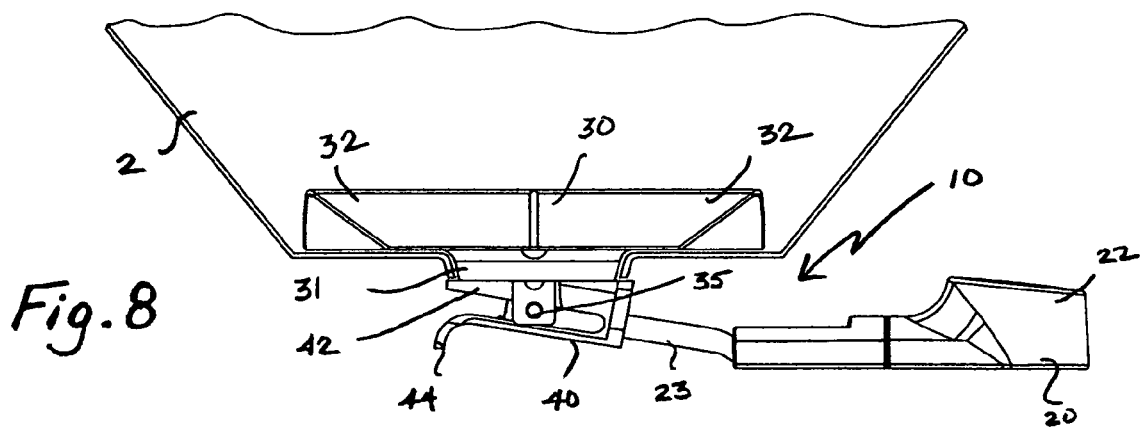
FIG. 8 is a perspective view of FIG. 7 in a latched position.

FIGS. 6-8 show how the scraper handle 20 and the axle rod 31 are designed to fit through the central aperture 11 of the bottomside 2b of the firebowl 2, and the clip 40 locks the scraper assembly 10 to the central aperture 11 of the firebowl 2 and locks the scraper handle 20 into a generally horizontal position in the latched position. The wedge 42 of the clip 40, in the latched position, is in close proximity to the central aperture 11 and prevents movement of the scraper assembly 10 except a rotary movement about a vertical axis about the central aperture 11. The wedge 42 constrains the movement of the scraper handle 20 in a generally horizontal plane, and the detent 43 of the spring arm 41 holds the clip 40 in its latched position. The protrusion 44 of said spring arm 41 aids manual movement by a user of the clip 40 between the latched position and an unlatched position.

The bottomside 2b of the firebowl 2 has a lip situated on the periphery of the central aperture 11, and the wedge 42 of the clip 40 is designed to contact the lip of the central aperture 11 to secure the ash scraper assembly 10 in the latched position. FIG. 7 shows the ash scraper assembly 10 in its unlatched position. The clip 40 is positioned against the stop 23 and the wedge 42 is disengaged from the central aperture 11 allowing the scraper handle 20 to pivot about the pivot pin 24.

Figure 9:
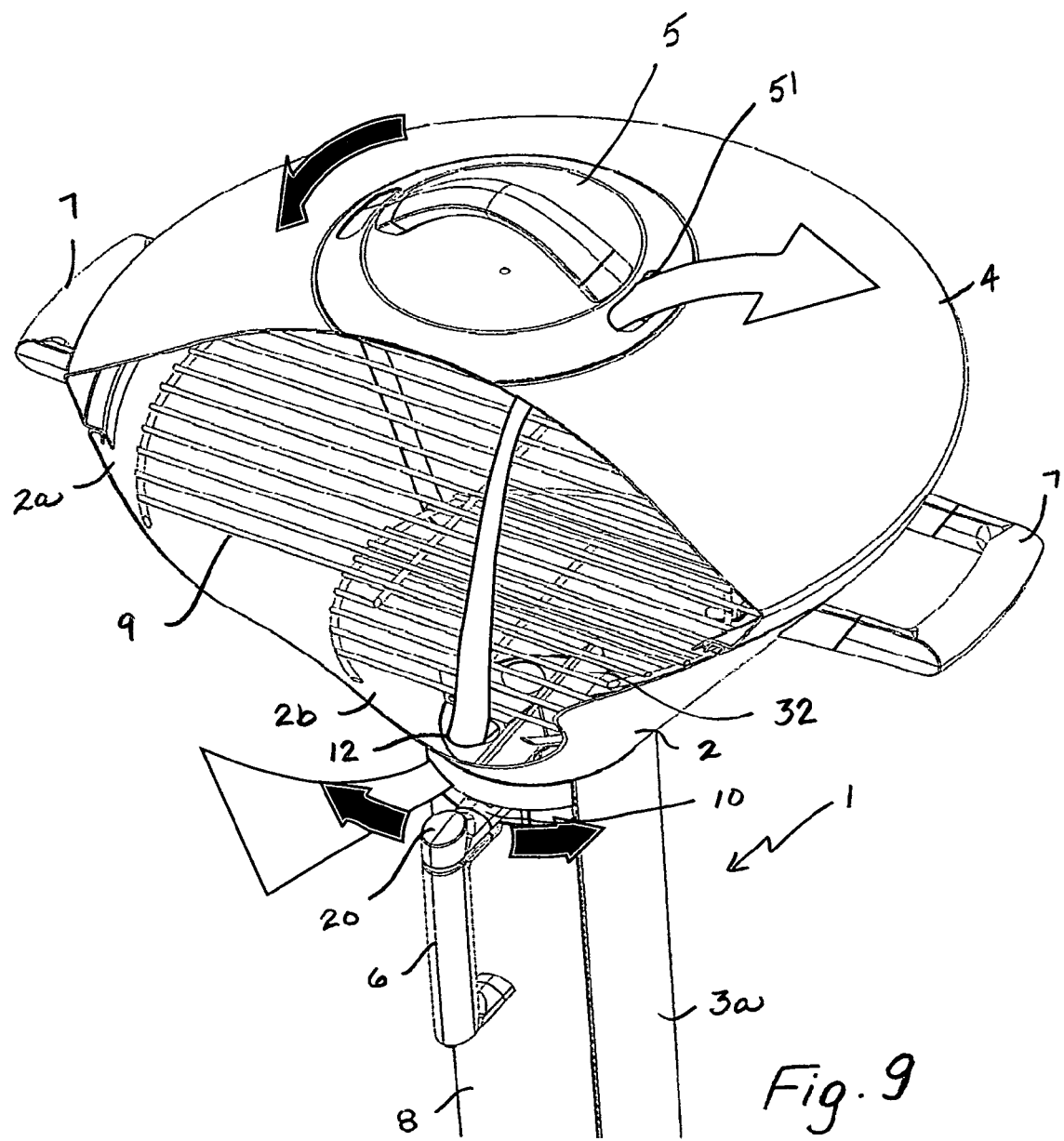
FIG. 9 is a cutaway perspective view of the ventilation system of one of the embodiments of the present invention.

FIG. 9 shows one of the embodiments of the ventilation system of the present invention. The barbecue cooking apparatus 1 comprises the funnel-shaped firebowl 2, the elongated cylindrical column 3a and the lid 4. The firebowl 2 has an open topside 2a, a bottomside 2b, handles 7 on its external surface and grills 9 situated within internal cavity of the firebowl 2. The peripheral apertures 12 are situated on the bottomside 2b of the firebowl 2. The arms 32 of the ash scraper 30 of the ash scraper assembly 10 are situated above the bottomside 2b of the firebowl 2 and are positioned not to cover the peripheral apertures 12 during a ventilation stage. The lid 4 has a handle 5 which is movable (usually twisted) to open the lid vent 51 during the ventilation stage. The column 3a has a removable ash bin 8 and a handle 6. There is an opening above the handle 6 where the scraper handle 20 protrudes from the opening and allowing user access to the ash scraper assembly 10. During a scraping and/or ventilation stage, the user guides the scraper handle 20 along the horizontal opening using a horizontal movement to allow the arms 32 to uncover the peripheral apertures 12 during the ventilation stage and to scrape the bottom surface of the bottomside 2b of the firebowl 2 during the scraping or cleaning stage.

Figure 10:
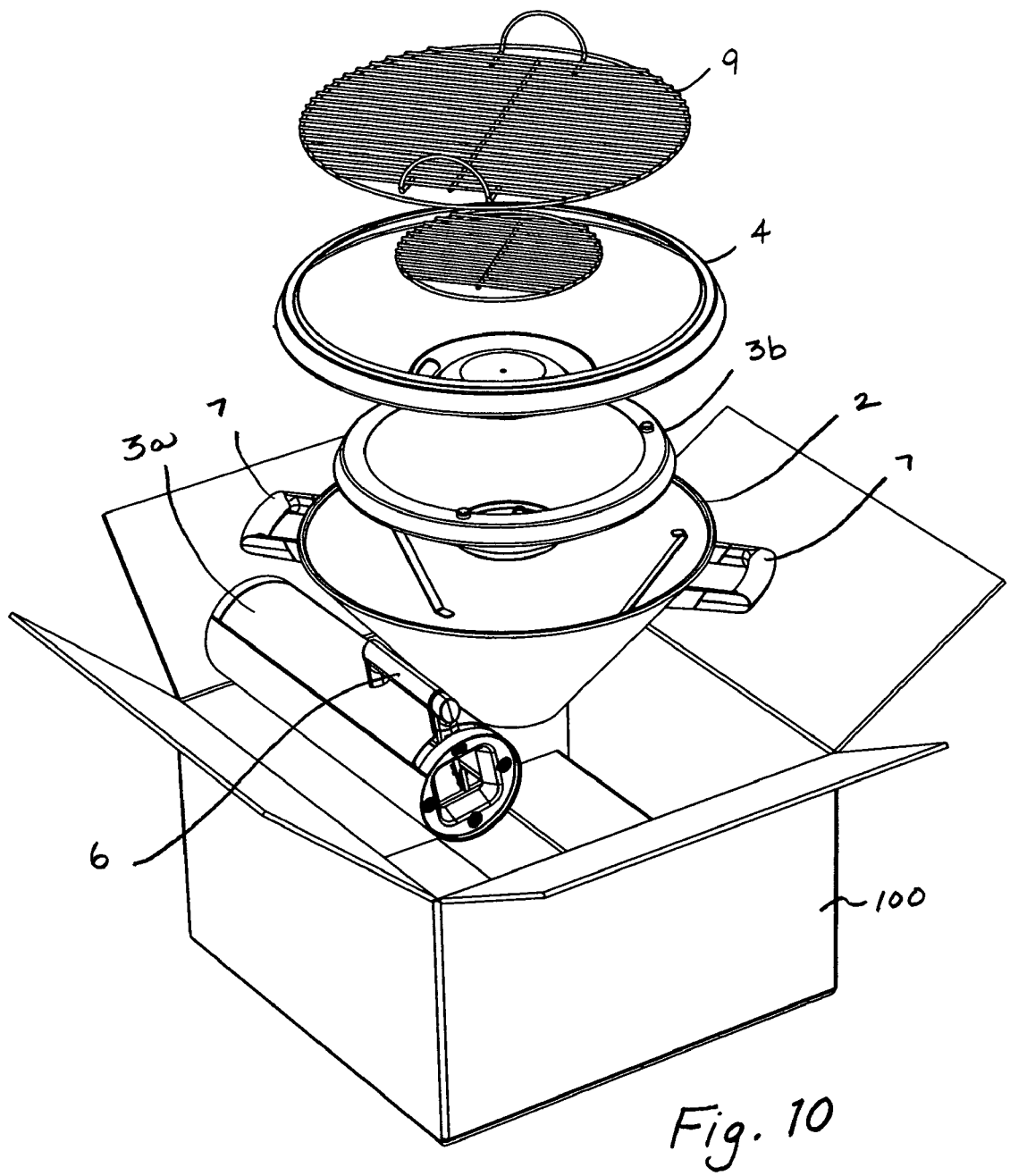
FIG. 10 is an exploded view of the components of the barbecue of the present invention and showing how the components are disassembled and assembled for packaging and shipment.

FIG. 10 relates to how the barbecue of the present invention is disassembled and packaged for shipment. The grills 9 are situated on the bottomside of the lid 4 which sits atop the underside of the base 3b and the base 3b sits within the firebowl 2.

Figure 11:
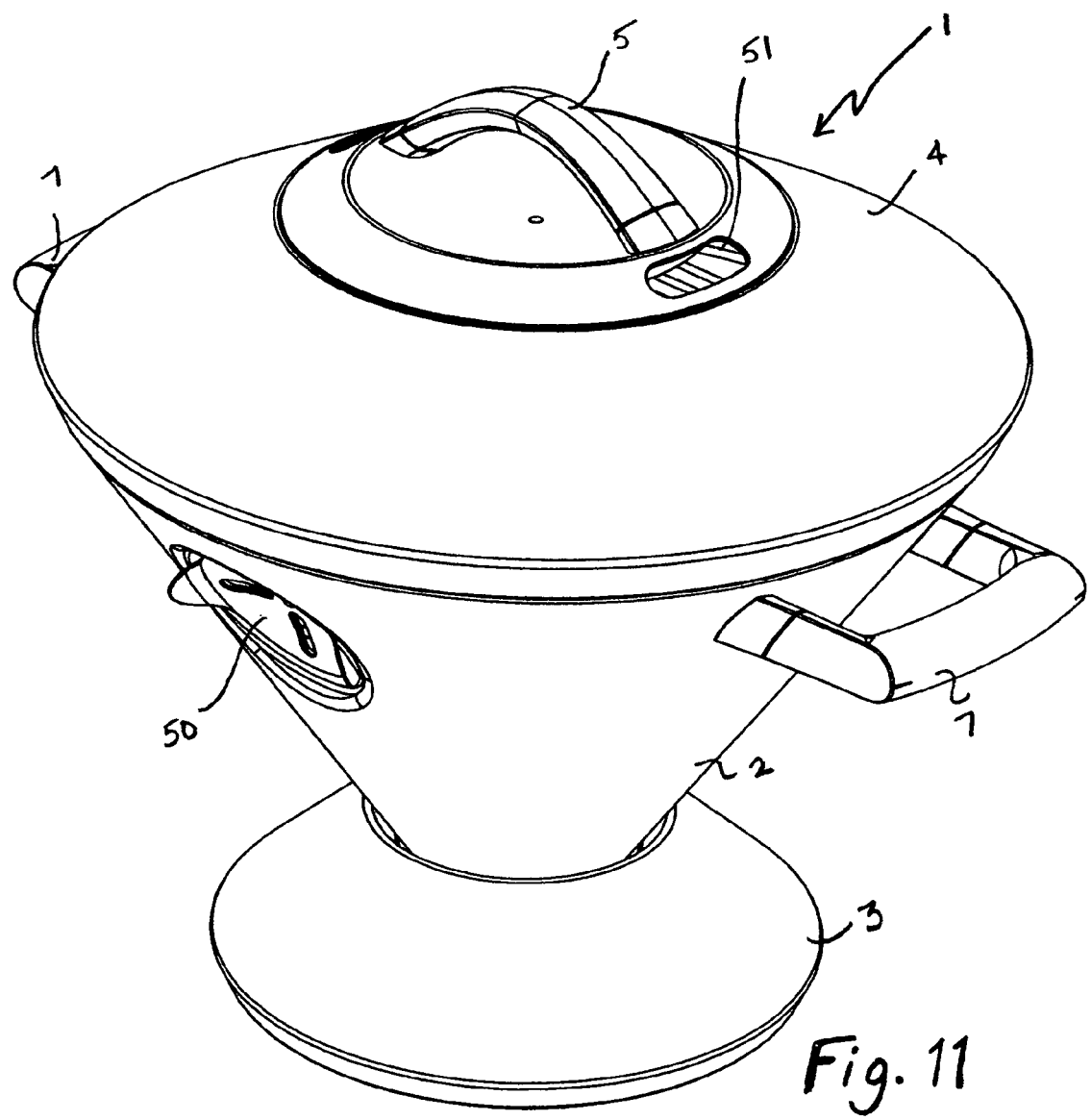
FIG. 11 is a perspective view of another embodiment of the present invention showing the smaller version of the martini-shaped grill.
Figure 12:
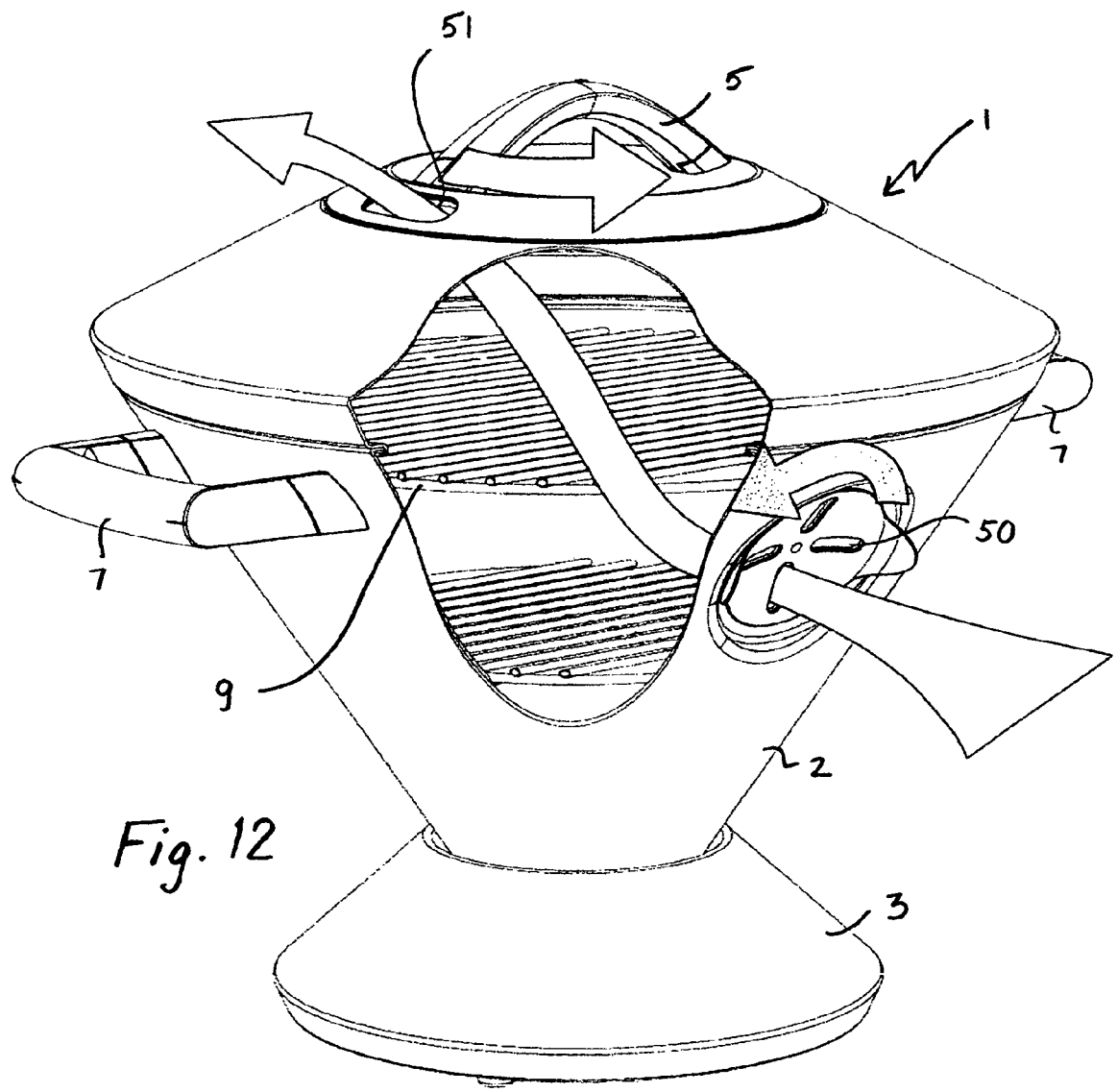
FIG. 12 is a cutaway perspective view of ventilation system of FIG. 11.

FIGS. 11-12 relate to another embodiment of the present invention, specifically, the smaller version of the Martini Grill™. The barbecue apparatus 1 comprises a base frame 3, a firebowl 2 and a lid 4. The lid comprises a movable handle 5 which by a twisting motion opens and closes the lid vent 51. The firebowl 2 comprises two opposing handles 7 and a vent 50. During use, the firebowl 2 sits atop the base frame 3 and the lid 4 rests upon the open topside of the firebowl 2. Grills 9 are situated within the firebowl 2. During a ventilation stage, the lid vent 51 and vent 50 are in an open position to allow the air to enter the vent 5 and exit from the lid vent 51. The vent 50 on the firebowl has vent apertures 52 and a device 53 for opening and closing the vent apertures 52.

Figure 13A:
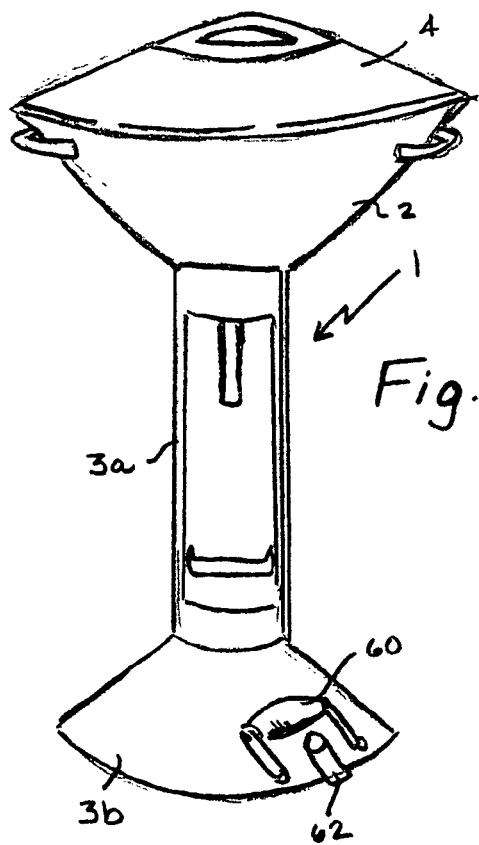
FIGS. 13a-b are perspective views of the hidden wheel system of the present invention.
Figure 13B:
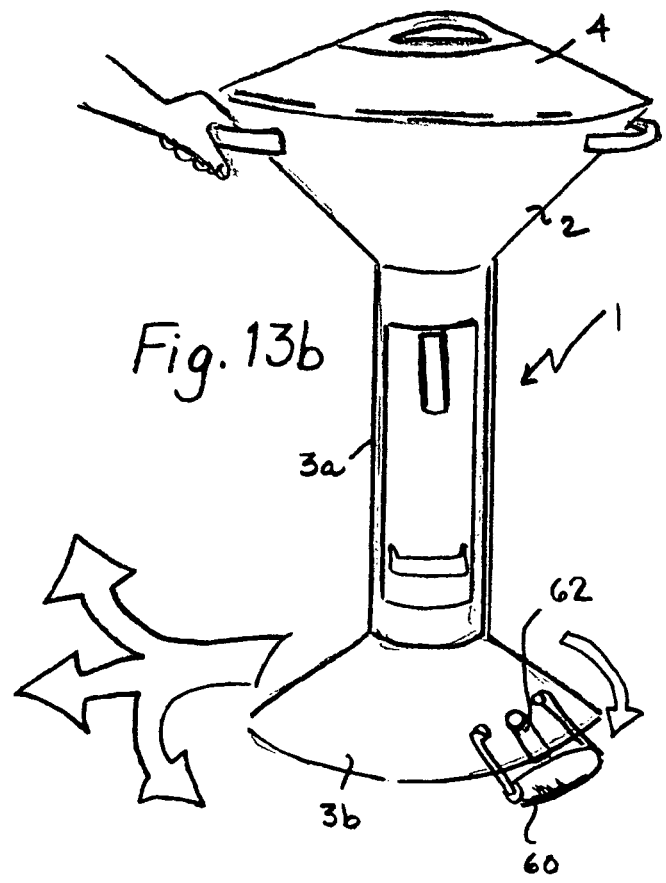

FIGS. 13a-13b relates to another embodiment of the present invention, in particular, the portability feature of the barbecue 1. The barbecue 1 comprises a base frame 3 having a base 3b and a cylindrical column 3a. The column is connected to the firebowl 2 and a lid 4 is situated atop the firebowl 2. The base 3b comprises a foldable wheel 60 and a locking mechanism 62. During a stationary use position, the foldable wheel 60 is situated atop the surface of the base 3b. During a moving position, the foldable wheel 60 is extended and makes contact with the ground and the locking device 62 is extended to secure the position of the foldable wheel 60. The user may then move the barbecue 1 by pulling or pushing the handle 7 on the firebowl 2.

FIGS. 14a, 14b and 14c illustrate another feature of the present invention, specifically the dual function of the ash bin 8 as both an ash catcher and charcoal starter chimney device. The ash bin 8 is situated within the cylindrical column 3a of the barbecue 1. The ash bin 8 comprises at least four walls and an open topside creating an internal cavity. The fourth wall is an exterior surface of the ash bin 8 and the column 3a when the ash bin is inserted into the column 3a. The ash bin has a first stationary handle 6 and a second removable handle 81 which is connected to two connectors 80. The bin 8 has an aperture 85 leading to an internal cavity of the ash bin/chimney 8.

FIGS. 14b-14c show a transparent view of the internals of the ash bin 8. There is a screen 84 for holding charcoal situated within the internal cavity of the ash bin 8. In another embodiment, the tube-shaped ash bin 8 has a moveable flap 83 at or near the bottom of the ash bin 8 which when in the closed position seals the bottom and when in the open position allows air to flow through the bottom. The flap 83 is actuated by the movable handle 81. The handle 81 is oriented parallel to the flap 83 so it visually gives an indication as to whether the flap is open or closed. The fixed screen 84 is situated just above the flap 83 in its closed position. The screen 84 separates the interior of the tube into two chambers: the above chamber for charcoal and the below chamber for combustible starting material (newspaper). At the bottom of the bin 8, there is at least one opening 85 in one of the side walls leading into the newspaper chamber; the aperture or opening 85 is used to allow the newspaper to be lit easily and to encourage air flow.

The fixed handle 6 is situated above the movable handle 81 and is designed to aid in handling the ash bin/chimney 8. In particular, when the charcoal is hot, both handles should be used. The movable handle 81 has a stop to prevent its movement past the horizontal orientation. To prevent inadvertent opening of the flap 83, the rod 86 on which the flap 83 pivots extends out the back of the bin 8 and is bent to form a leg 82. While the flap 83 is in its closed position, the leg 82 of the rod 86 is vertical allowing the bin 8 to fit in through the opening in the column 3a. While the flap 83 is in its open position, the leg 82 extends horizontally preventing the bin 8 from being replaced into the column 3a. Likewise, while the bin 8 is in the column 3a, the leg 82 prevents the handle 81 from moving so that the flap 83 will not open.

In one embodiment, the procedure for starting the charcoal and using the dual functioning ash bin is as follows: 1) the ash bin 8 is removed from the column 3a and if there are any ashes or ash residues, the ash bin 8 is emptied out; 2) the handle 81 is rotated down thereby moving the flap 83 away from the screen 84 and opening the bottom of the ash bin 8 to form a charcoal starting chimney—the flap 83 is moved downwardly by moving the handle 81 in a downward motion to a generally parallel position relative to the ash bin handle 6 and away from one of the connectors 80; 3) crumpled-up newspapers are placed in the bottom of the ash bin/chimney 8 and the bin 8 may be placed on the charcoal grate in the firebowl 2 or the grill 9; 4) a specified amount of charcoal briquettes are placed into the open topside of the bin 8 and the charcoal sits atop the screen 84; 5) the newspaper is lit 9 (access coming from aperture 85) and the briquettes are allowed to burn until they have some gray ash on them; 7) the lit charcoal is then poured onto the charcoal grate of the firebowl 2 using the handle 81 and handle 6; 8) the flap 83 of the ash bin 8 is then placed in a position adjacent to the screen 84 and the chimney is thereby closed—the flap 83 is moved upwardly by moving the handle 81 in an upward motion to a generally perpendicular position relative to the ash bin handle 6 and connected to both of the connectors 80; and 9) the bin 8 is replaced into the column 3a.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A barbecue cooking apparatus with ventilation device, said apparatus and device comprising:
    a firebowl having an open topside and a bottomside, said bottomside comprising at least one aperture;
    a base attached to the bottomside of said firebowl, said base comprises an internal cavity, said aperture of said bottomside of said firebowl leading to said internal cavity of said base, said base having at least one opening for ventilation;
    at least one ash scraper assembly, said assembly comprising at least one scraper and at least one scraper handle, said scraper comprises an axle rod and a plurality of arms directly attached to and extending from said axle rod, said scraper handle designed to be connected to the scraper to thereby rotate the arm to allow said arm to cover and uncover said aperture for venting purposes; and
    a lid situated atop said open topside of said firebowl, said lid having at least one opening for ventilation, said lid further comprising a device for opening and closing said opening.

2. The apparatus of claim 1 wherein said lid comprises a lid handle, said lid handle designed to rotate about an axis and open and close said opening on said lid.

3. The apparatus of claim 1 wherein said base comprises a base handle.

4. The apparatus of claim 3 wherein said base handle is attached to said ash scraper assembly and is designed to open and close said aperture in said firebowl.

5. The apparatus of claim 4 wherein said base handle is designed to move in a side to side motion to control movement of said ash scraper assembly to hereby open and close said aperture in said firebowl for ventilation purposes.

6. The apparatus of claim 1 further comprising an elongated column, said column having top and bottom portions and a central cavity, said aperture of said firebowl leads to said central cavity of said column.

7. The apparatus of claim 6 wherein said top portion of said column is attached to said bottomside of said firebowl and said bottom portion of said column is attached to said base.

8. The apparatus of claim 6 wherein said column further comprises a door for accessing said central cavity and a handle for opening said door.

9. A barbecue cooking apparatus with ventilation device, said apparatus and device comprising:
    a firebowl having an open topside and a bottomside, said bottomside comprising at least one aperture;
    a column having a top and a bottom, said top of said column being attached to the bottomside of said firebowl, said column comprises an internal cavity, said aperture of said bottomside of said firebowl leading to said internal cavity of said column, said column having at least one opening for ventilation;

a base connected to said bottom of said column;

at least one ash scraper assembly, said assembly comprising at least one scraper and at least one scraper handle, said scraper comprises an axle rod and a plurality of arms directly attached to and extending from said axle rod, said scraper handle designed to be connected to the scraper to thereby rotate the arm to allow said arm to cover and uncover said aperture for venting purposes; and a lid situated atop said open topside of said firebowl, said lid having at least one opening for ventilation, said lid further comprising a device for opening and closing said opening.

10. The apparatus of claim 9 wherein said lid comprises a lid handle, said lid handle designed to rotate about an axis and open and close said opening on said lid.

11. The apparatus of claim 10 wherein said column comprises a column handle.

12. The apparatus of claim 11 wherein said column handle is attached to said ash scraper assembly and is designed to open and close said aperture in said firebowl.

13. The apparatus of claim 12 wherein said column handle is designed to move in a side to side motion to control movement of said ash scraper assembly to hereby open and close said aperture in said firebowl for ventilation purposes.

14. The apparatus of claim 9 wherein said firebowl is funnel shaped.

15. The apparatus of claim 9 wherein said firebowl, said column and said base form a martini shaped grill.

16. The apparatus of claim 9 wherein said column comprises an opening leading from said central cavity, said column comprising a device for opening and closing said opening on said column.

17. A barbecue cooking apparatus with ventilation device, said apparatus and device comprising:

a firebowl having an open topside and a bottomside, said bottomside comprising at least one aperture;

a column having a top and a bottom, said top of said column being attached to the bottomside of said firebowl, said column comprises an internal cavity, said aperture of said bottomside of said firebowl leading to said internal cavity of said column, said column having at least one opening for ventilation;

a base connected to said bottom of said column;

a lid situated atop said open topside of said firebowl, said lid having at least one opening for ventilation, said lid further comprising a device for opening and closing said opening; and at least one ash scraper assembly, said assembly comprising at least one scraper and at least one scraper handle, said scraper comprises an axle rod and at least two arms directly attached to and extending from said axle rod, said scraper handle designed to be connected to the scraper to thereby rotate the arm to allow said arm to cover and uncover said aperture for venting purposes.

18. The apparatus of claim 17 wherein said wherein said lid comprises a lid handle, said lid handle designed to rotate about an axis and open and close said opening on said lid, said column comprises a handle, said lid handle is attached to said ash scraper assembly and is designed to open and close said aperture in said firebowl.

* * * * *